(12) United States Patent
Dreano

(10) Patent No.: US 7,118,368 B2
(45) Date of Patent: Oct. 10, 2006

(54) MOLD TABLE FOR FOOD PRODUCTS AND METHOD OF MAKING SAID TABLE

(75) Inventor: Claude Dreano, Mauron (FR)

(73) Assignee: Armor Inox SA, Mauron (FR)

( * ) Notice: Subject to any disclaimer, the term of this patent is extended or adjusted under 35 U.S.C. 154(b) by 65 days.

(21) Appl. No.: 10/205,609

(22) Filed: Jul. 26, 2002

(65) Prior Publication Data

US 2003/0024400 A1 Feb. 6, 2003

(30) Foreign Application Priority Data

Jul. 27, 2001 (FR) .................................. 01 10291
Oct. 16, 2001 (FR) .................................. 01 13405

(51) Int. Cl.
*A21C 3/002* (2006.01)
*A21C 7/002* (2006.01)

(52) U.S. Cl. ...................... 425/195; 425/234; 425/338; 249/126; 249/159; 426/512

(58) Field of Classification Search ................ 425/195, 425/233, 234, 235, 338, 339, 340; 249/126, 249/159; 426/512, 517; 99/349, 351
See application file for complete search history.

(56) References Cited

U.S. PATENT DOCUMENTS 1,586,528 A * 6/1926 Hoddersen-Balling ....... 99/351
4,525,133 A * 6/1985 Bergmann ................... 249/156
4,957,271 A * 9/1990 Summers et al. ............ 426/523
5,381,725 A * 1/1995 Breunig et al. ................ 99/349
5,921,171 A * 7/1999 Dreano ......................... 99/351
5,992,304 A * 11/1999 Champalaune et al. ....... 99/349
6,021,995 A * 2/2000 Cody .......................... 249/155

FOREIGN PATENT DOCUMENTS

| DE | 20104984 U1 | 6/2001 |
|---|---|---|
| EP | 0292417 A2 | 11/1988 |
| EP | 0625325 A1 | 11/1994 |
| FR | 1003069 | 3/1952 |
| FR | 2485884 | 1/1982 |
| FR | 2615484 | 11/1988 |
| FR | 2658483 A1 | 8/1991 |
| FR | 2669004 A1 | 5/1992 |
| FR | 2788199 A1 | 7/2000 |
| WO | WO 0121001 A1 | 3/2001 |

* cited by examiner

*Primary Examiner*—Yogendra N. Gupta
*Assistant Examiner*—Thu Khanh T. Nguyen
(74) *Attorney, Agent, or Firm*—Lowe, Hauptman & Berner

(57) ABSTRACT

The present invention concerns a mold table for food products comprising at least one longitudinal conduit that can be closed by a cover. Each conduit has a variable cross section that defines at least one cavity that forms a mold for the food products.

26 Claims, 8 Drawing Sheets

MOLD TABLE FOR FOOD PRODUCTS AND METHOD OF MAKING SAID TABLE

RELATED APPLICATIONS

Figure 1A:
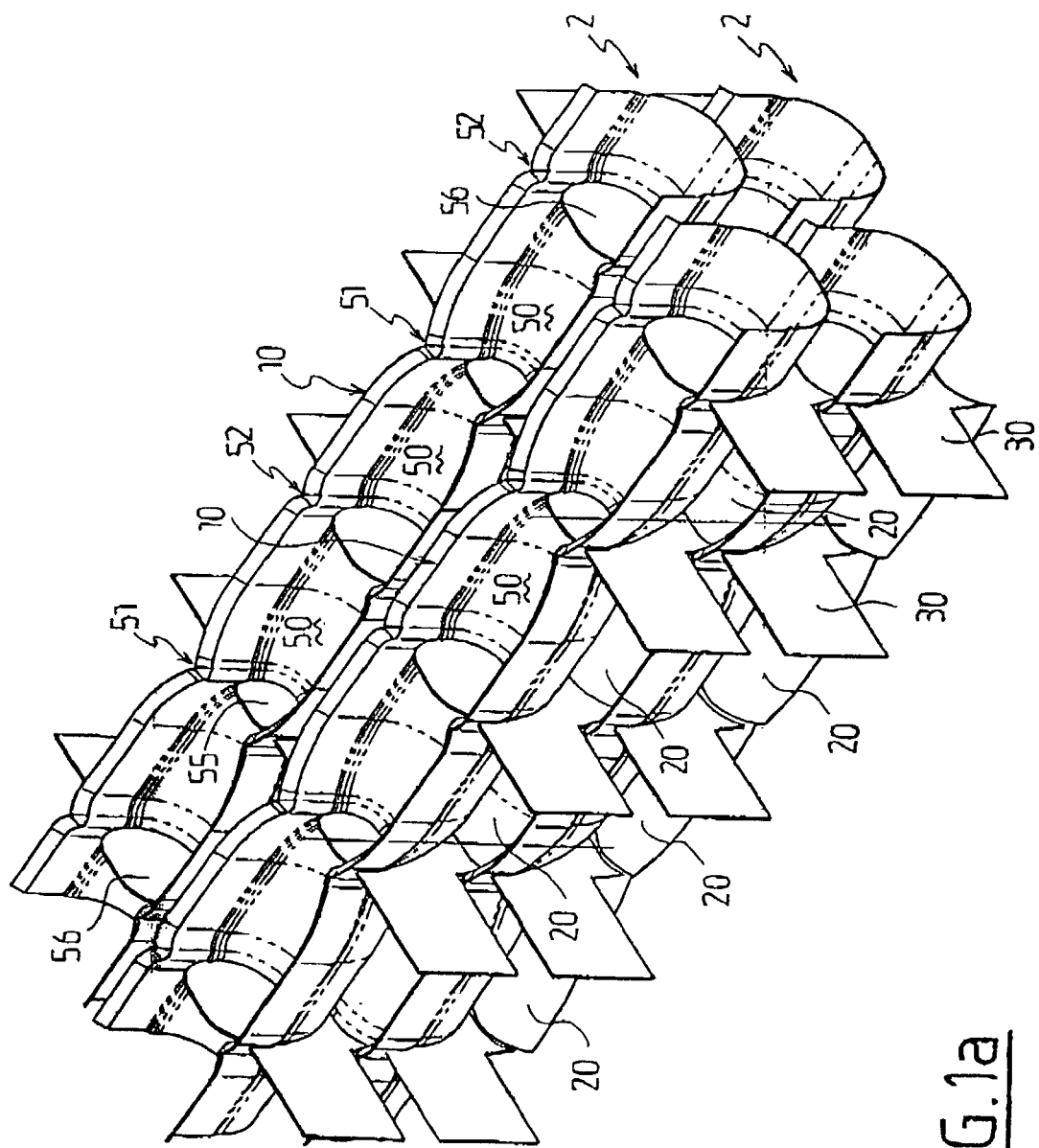

The present application is based on, and claims priority from, French Application Serial Number 01 01291, filed Jul. 27, 2001 and French Application Serial No. 0113405, filed Oct. 16, 2001, the disclosure of both of which are incorporated by reference herein in their entirety.

The present invention concerns a mold table for food products such as hams, a stackable set of mold tables for the industrial molding of food products and a method for manufacturing a mold table according to the invention.

The industrial cooking of certain food products such as hams necessitates a molding. In the manufacture of molded ham, the meat is introduced into closed molds in which it can be cooked and pressed.

It is well known to mold food products of this type by means of a stackable set consisting of a series of stacked tables, each table, called a multiple cavity mold table, comprising a plurality of molds and joined at the base to each of the molds, covers adapted to the closure of the molds of the lower table. A multiple cavity mold table can consist of individual molds arranged side by side or behind one another. It can also consist of longitudinal U-shaped conduits arranged side by side so as to be parallel. Each conduit can be divided into several cells. Each table can also comprise only one conduit. Molding sets of this type for food products are described, for example, in the French Patents No. 80 152 12, 87 07 108 or 90 140 19.

An applicant currently exists for molded hams having a curved shape, i.e. with a variable cross section, for example in the form of a mandolin or rugby ball, in order to obtain cut slices of different sizes.

These types of hams can be obtained by stackable sets that are currently known which consist of a plurality of individual molds, as the set described in the French Patent No. 80 152 12. However, the stacking of molds is very difficult to carry out, all the more so because the support tables are interchangeable.

The very slight deformation of a mold or of a cover can produce a shift, even if very slight, which can result in the poor pressing of an entire layer.

The stackable sets consisting of longitudinal conduits, as those described in the French Patents No. 87 07 108 or No. 90 140 19, have good mechanical properties, in particular with respect to the resistance to deformation. However, in their current configuration, they cannot be used to press hams having an elongated shape with a variable cross section.

In particular, the object of the present invention is a mold table for food products that enables one to obtain pressed products having an elongated shape with a variable cross section, a table which has good mechanical properties, in particular a significant resistance to deformation and which enables a good connection between the mold and the corresponding covers.

To this end, it proposes a mold table for food products comprising at least one longitudinal conduit that can be closed by a cover, wherein the said or each conduit has a variable cross section so as to define at least one cavity forming a mold for the said food products. Advantageously, to define the said or each cavity, the said or each conduit has narrowing zones at regular intervals over its length.

Moreover, the said or each conduit comprises, at the level of each of said narrowings, a transverse partition that divides each cavity into a compartment.

According to another embodiment, to define the said or each cavity, the said or each conduit comprises, on the one hand, small-sized narrowing zones and larger-sized narrowing zones over its length and, on the other hand, lateral curved walls so as to join the said narrowing zones and to render the cross section of each cavity variable. The said or each conduit can comprise, at the level of said narrowing zones, small-sized transverse partitions and larger-sized transverse partitions to define a compartment with variable cross section for each cavity.

According to another embodiment, the said or each conduit comprises narrowing zones provided for defining, on the one hand, the said cavities forming a mold for the said food products and, on the other hand, cavities that are smaller in size than the cavities. The said or each conduit can thus comprise, at the level of said narrowing zones, small transverse partitions and larger transverse partitions to define a compartment for each cavity.

According to another feature of the invention, the said or each conduit comprises, at the level of each of its edges, a release toward the outside, in order to define a recess in which the said cover can be inserted so as to be adjustable. The said release toward the outside extends, for example, more or less vertical with, at the level of its upper part, a flap toward the outside to define a widening that facilitates the guidance of said cover. The said flap can be flat and inclined at 45° but it can also have a round cross section and end in a longitudinal horizontal plane.

In a preferred embodiment, the said mold table for food products comprises several conduits arranged side by side so as to be parallel and transverse tables forming struts which are arranged longitudinally at regular intervals between the said conduits and on which the said conduits are fixed. The said transverse tables that form the struts extend advantageously laterally for a certain distance distance beyond which the conduits engage on both sides of the said table.

According to another feature of the invention, a cover is fixed on said transverse tables forming struts underneath the said or each of said conduits such that, when two mold tables are stacked, a cover of the upper table can come to sit in the release of a conduit of the lower table.

According to another feature of the invention, a cover is fixed below the said or each of said conduits by flexible means.

According to another feature of the present invention, each transverse partition has its upper ridge which is rectilinear and approximately at the level of the upper edges of the conduits and the said cover consists of several cover elements provided to house it between two transverse partitions. Moreover, each cover element is fixed by struts underneath a conduit of another table so as to be able to close a cavity between two transverse partitions.

According to a variation of the embodiment, each transverse partition is provided with lateral openings.

A table according to the invention is mounted, for example, on a support frame provided with feet and crossbars so as to render it stackable.

The present invention also relates to a process for manufacturing a mold table for food products as will be described. This process consists essentially of forming the said or each conduit by stamping a flat sheet metal. Similarly, each cover can be formed by stamping a flat sheet metal. But, it can also be formed by cutting a conduit along a longitudinal horizontal plane and only keeping the lower part. Advantageously, the cutting plane of a conduit corresponds to the plane containing the fold forming the release of the said conduit.

Figure 1B:
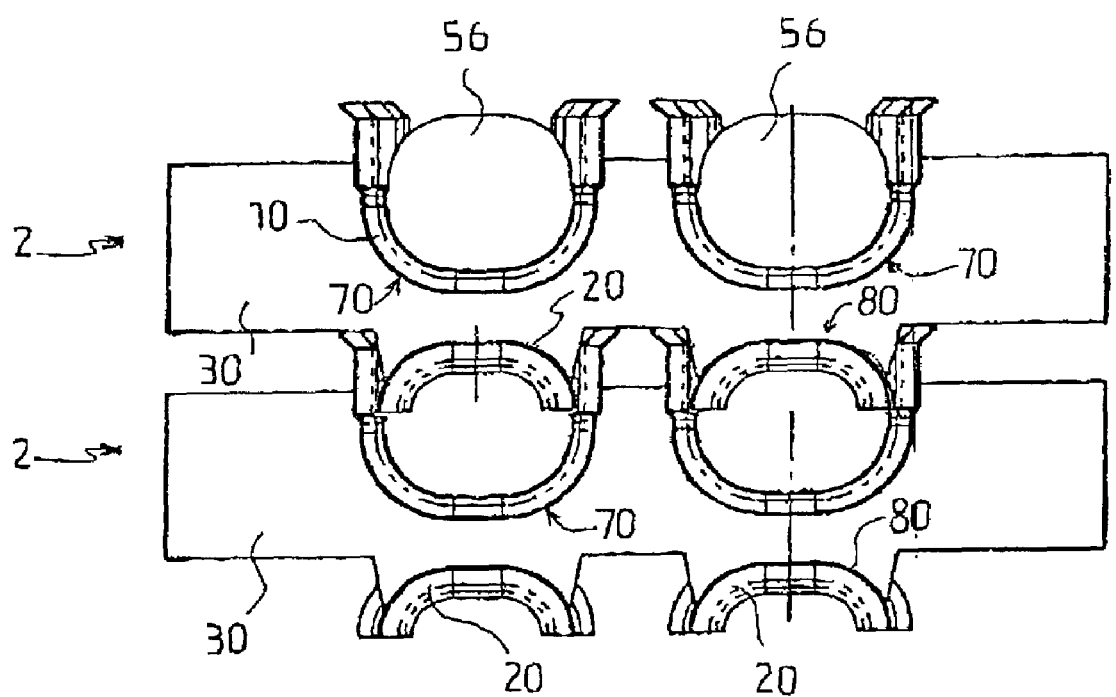
Figure 2:
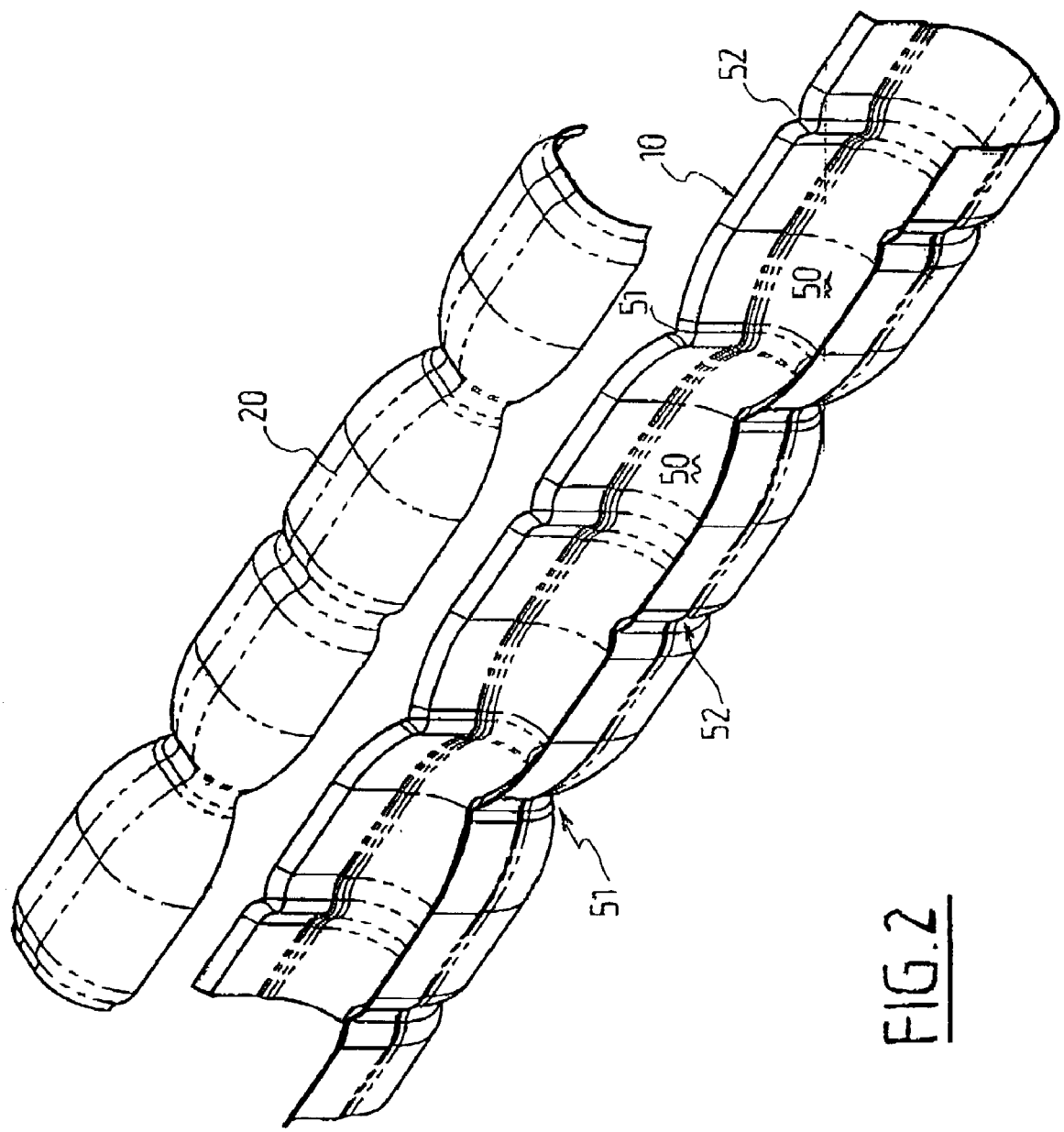
Figure 3A:
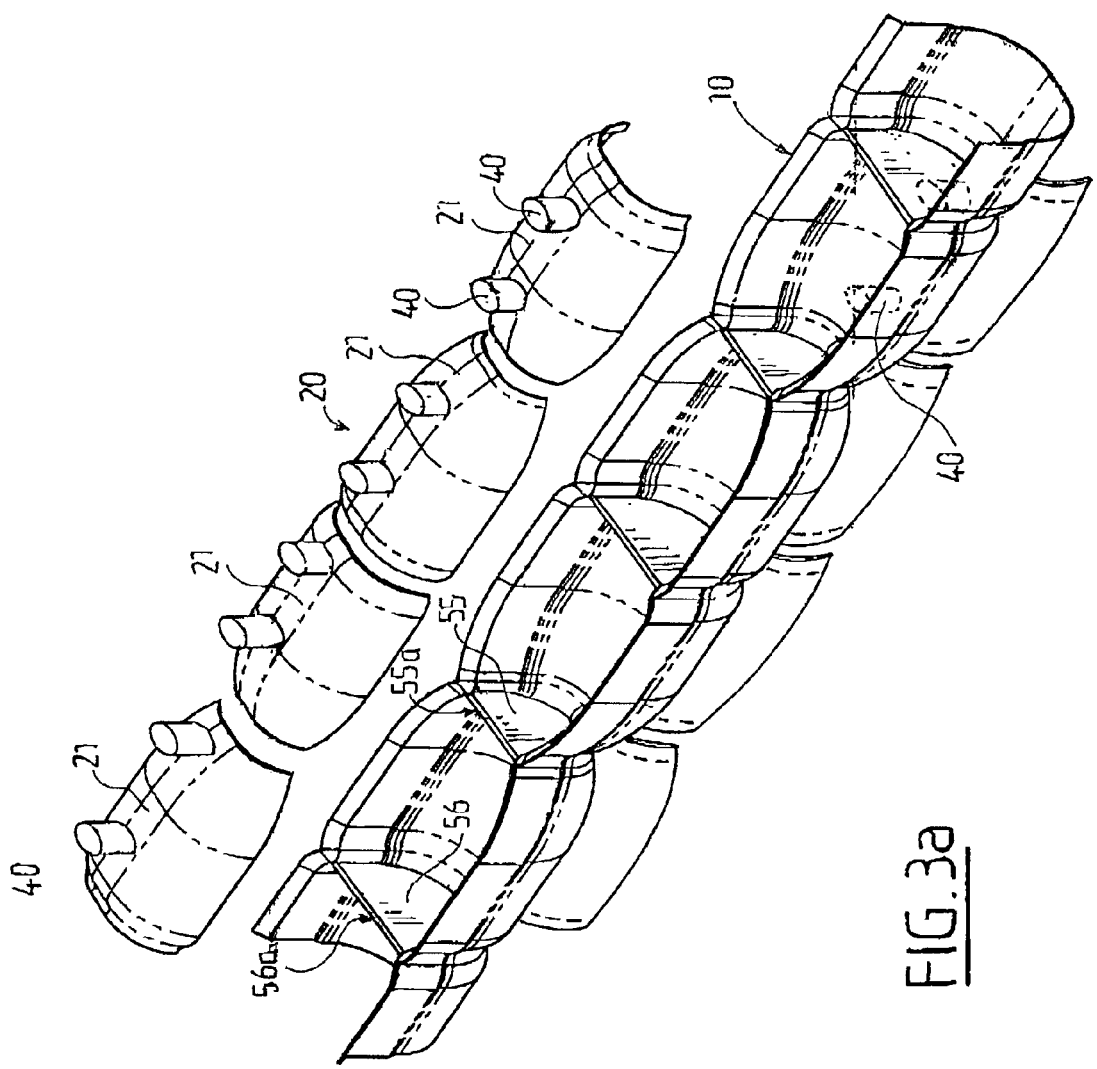
Figure 3B:
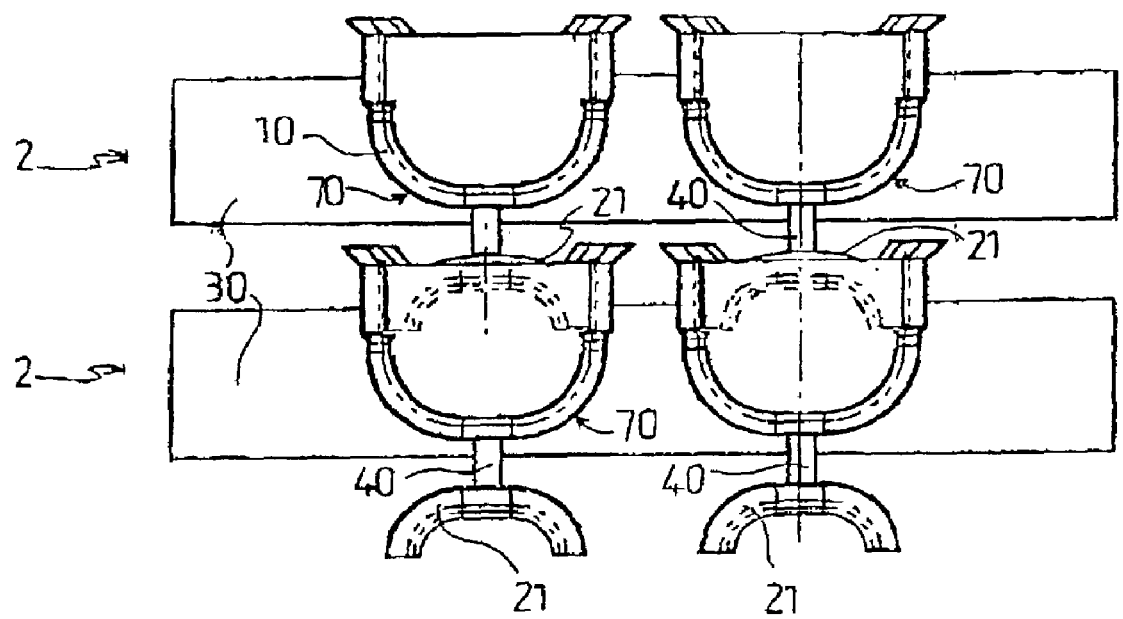
Figure 4:
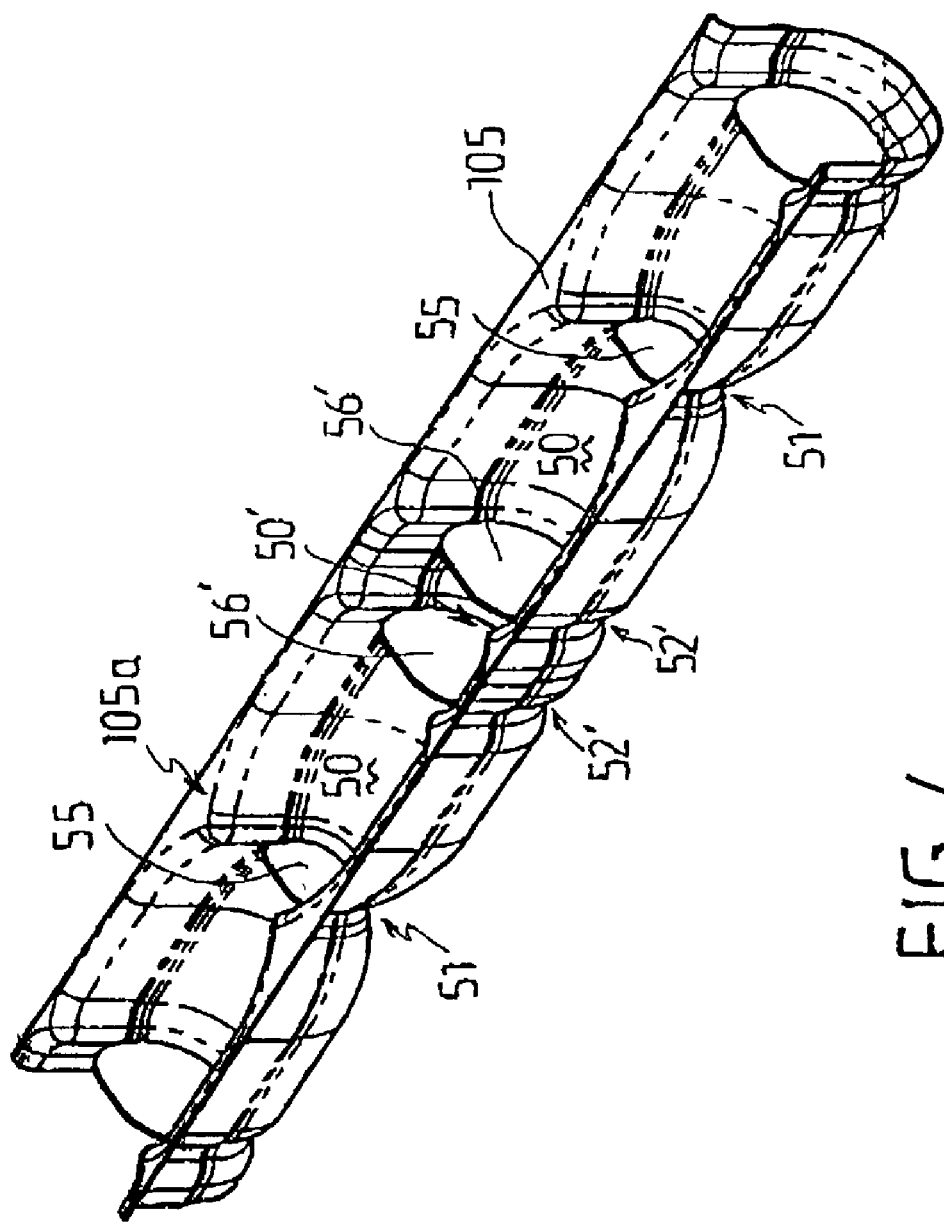
Figures 5A, 5B:
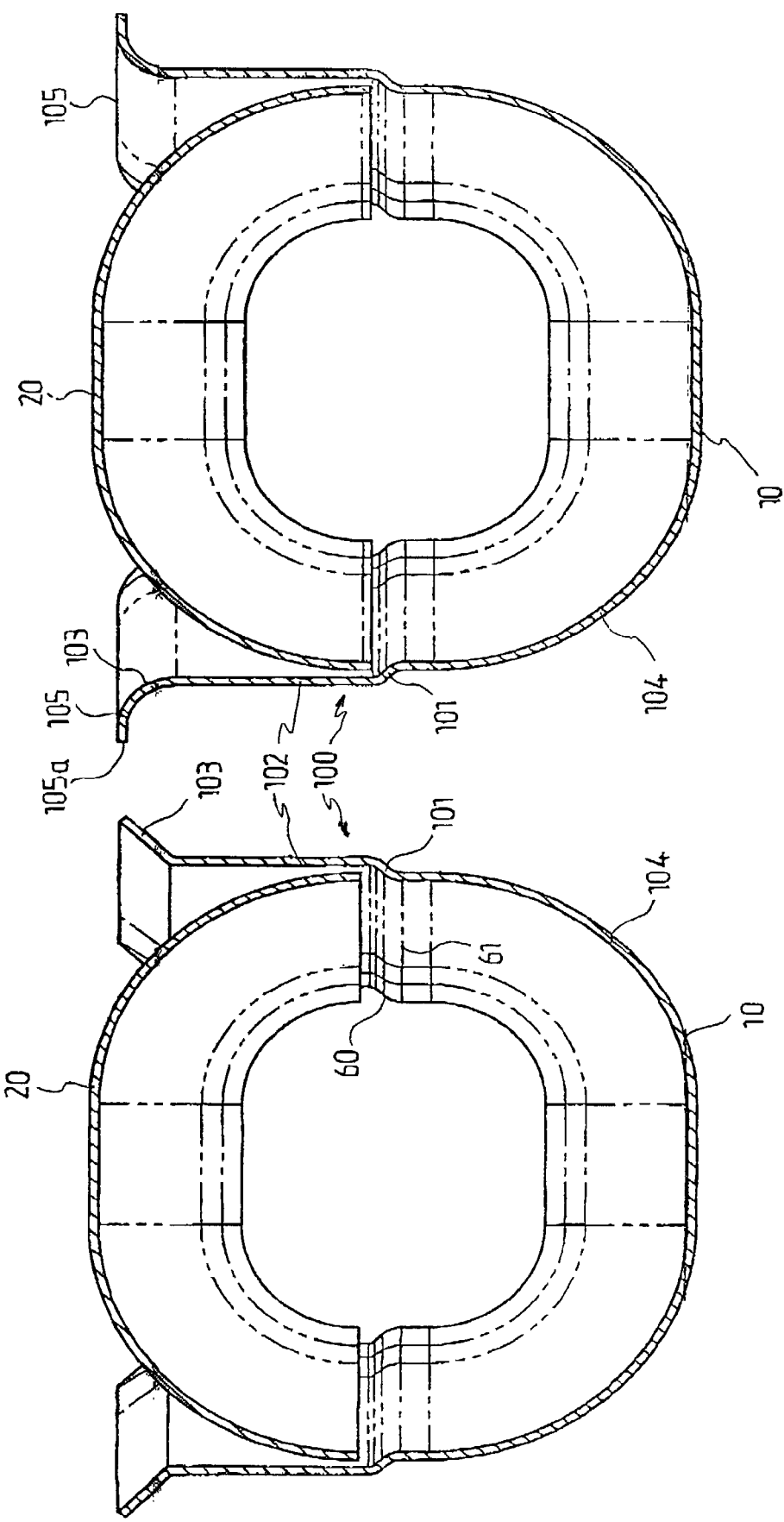
Figure 6:
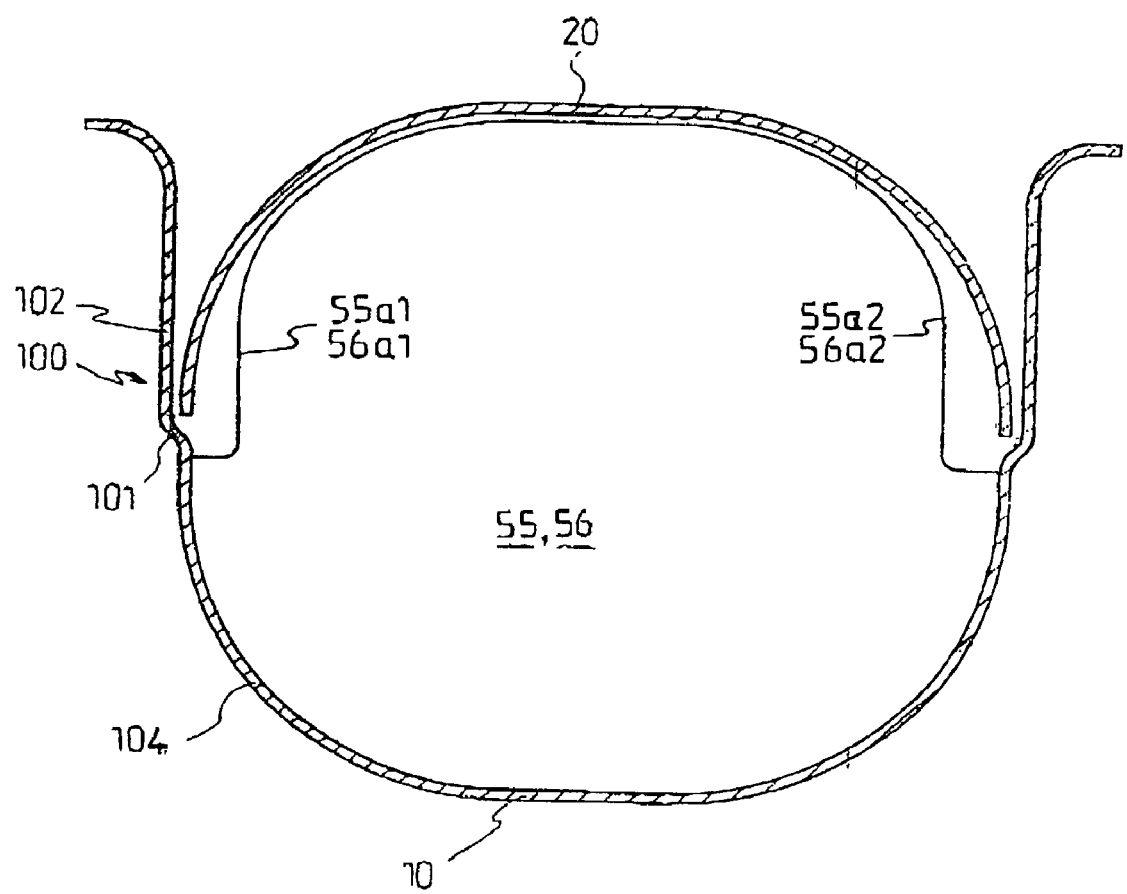

The invention, its features and its advantages, will become clearer from the following detailed description of an example of an embodiment of a stackable set for molding food products according to the invention, with reference to the attached drawings, showing:

FIGS. 1a and 1b are, respectively, a perspective view of a stackable set comprising two tables according to the invention and a side view of a stackable set of this type, FIG. 2 is a perspective view of a conduit of a table for molding food products according to the invention, FIGS. 3a and 3b are, respectively, a perspective view of a stackable set comprising two tables according to another embodiment of the invention and a side view of a stackable set of this type, FIG. 4 is a perspective view of a conduit of a table for molding food products provided with partitions according to another embodiment of the invention, FIGS. 5a and 5b are, respectively, sectional views of conduits on which covers are mounted according to two embodiments, and FIG. 6 is a sectional view along a transverse plane of a conduit according to an embodiment of the invention.

The stackable molding set shown in FIGS. 1a and 1b is one example for the application of the present invention. It essentially comprises two tables 2 comprising two longitudinal conduits each 10 having narrowing zones 51 and 52 so as to form at least one cavity 50 (in this instance, six) that form molds. Each cavity 50 that forms a mold has an elongated shape with a variable cross section, for example, in the form of a rugby ball or a mandolin.

In the embodiment shown in FIGS. 1a and 1b, partitions 55 and 56 are joined and respectively fixed at the level of each narrowing zone 51 and 52 so as to divide the said conduits 10 into compartments 50. Unlike the individual molds placed end to end in the prior art, this arrangement enables one to have a monobloc structure in the conduit which has good mechanical properties.

In other embodiments, these partitions 55 and 56 can prove to be unnecessary and can thus be omitted. This is the case in the conduit 10 shown in FIG. 2.

Still, in the embodiment shown in FIGS. 1a and 1b, the narrowings 51 are small, while the narrowings 52 are larger. It will be noted in this case that the lateral walls of each conduit 10, by joining the narrowings 51 and 52 in pairs, have a curved shape with a variable cross section.

As can be seen in FIG. 2, each conduit 10 is intended to be closed by a cover 20 which, as a result, has a shape complementary to that of the conduit 10.

In particular, in the embodiment of a table shown in FIGS. 1a and 1b, a cover 20 extends underneath each of the conduits 10. In the example shown, each cover 20 is thus fixed to the conduits 10 by struts 30 which engage between the conduits 10 and the corresponding covers 20. However, it will be noted that the mounting of the covers 20 on the conduits 10 can also be a mounting with flexible return means of type as described, in particular, in the French Patent No. 98 07 206.

The struts 30 shown in FIGS. 1a and 1b are arranged at regular intervals over the length of the table 2. They engage, more precisely, at the level of the narrowing zones 51 and 52 between the cavities 50 that form the molds. In the embodiment shown, these struts 30 are in the same plane as the corresponding partitions 55 or 56.

More precisely, in the upper part of the table 30, notches 70 are arranged that form recesss adapted to receive a conduit 10 each at the level of a narrowing zone 51, 52 between two cavities 50. The shape of the notches 70 depends on the fact that the table 30 must be placed at the level of a large narrowing zone 51 or a small narrowing zone 52 (in the case where they are not the same size). Notches 80 that form recesss adapted so as to overlap a cover 20 each also at the level of a narrowing zone 51, 52 between two cavities 50 are arranged on the lower part of the table 30. In this case also, the shape of the notches 80 depends on the fact that the table 30 must be placed at the level of a large narrowing zone 51 or a small narrowing zone 52 of the cavities 50 (in the event that they are not of the same size).

It can be seen in FIG. 1 that the struts 30 extend laterally for a certain distance beyond the conduits 10 that engage the table on both sides.

FIG. 2 shows a conduit 10 in a first embodiment. This conduit 10 has a variable cross section with a period undulation corresponding to the length of the cavities 50 or to a multiple of this length. In the present embodiment, the undulation described by the cross section of the conduit 10 is a period equal to two lengths of the compartments 50. Over this period, the shape of the conduit 10 is curved with a curve approximately in the form of an accolade, such that it defines a series of two cavities 50 that are open toward the top, extending longitudinally and having a transverse cross section that widens from a narrowing zone 51, then narrowing toward another narrowing zone 52 that is larger than the narrowing zone 51. The cross section of the conduit then widens again to form the adjacent cavity 50 whose narrowing zone 52 also comprises its larger narrowing zone, then narrowing up to the smaller narrowing zone and so on. Each cavity 50 thus has a small narrowing 51 and large narrowing 52 between which it has a curved shape toward the outside more or less in the shape of a rugby ball.

It will be noted that in another embodiment (not shown), the shapes of the narrowing zones 51 and 52 defining the cavities 50 are identical.

In FIG. 1a, it can be seen that the small narrowing zone 51 of each cavity 50 is closed by a small transverse partition 55 and the large narrowing zone 52 of this cavity 50 is closed by a large transverse partition 56. Each of these partitions 55, 56 has the shape of the cross section of the conduit 10 in the corresponding zone and is extended upward with a shape corresponding to the cross section of the cover 20 in this zone. On the other hand, in the embodiment shown in FIG. 2, these partitions 55 and 56 are absent.

The embodiment shown in FIGS. 3a and 3b differs from the one shown in FIGS. 1a and 1b in that the transverse partitions 55 and 56 have their upper ridge 55a and 56a, which are rectilinear, and more or less at the level of the upper edges of the conduits 10.

Moreover, the covers 20 are no longer comprised of a single part but of a set of cover elements 21 which, placed end to end, have the same shape as the cover 20 shown in FIGS. 1a and 1b. Each cover element 21 is fixed, by means of struts 40, to the lower part of each conduit 20 in such a way that it can come to rest between two partitions 55 and 56 of a lower conduit and thus close the cavity 50 enclosed between these two partitions 55 or 56. It will be noted that, in this embodiment, when a cover 20 is in position, the partitions 55 and 56 are located between two cover elements 21.

The use of this embodiment is particularly adapted when the food products that are cooked in each cavity of a conduit are enclosed in a plastic bag. In fact, it can be noted that the bags fold easily inside the corresponding cavity 50 and do not have a tendency to pass above the transverse partitions 55 and 56 that form the said cavity 50 where they would risk being sliced between the upper ridge 55a or 56a of these partitions and the cover 20.

The conduit 10 which is shown in FIG. 4 comprises, alternatively, a narrowing zone 51, then two narrowing zones 52 that have relatively less space between them than a narrowing zone 51 and a narrowing zone 52'. The result of this arrangment is that a narrowing zone 51 and a narrowing zone 52' define a cavity 50 between them that is relatively larger while the two narrowing zones 52' define a smaller cavity 50' between them. A conduit of this type can be used as follows: food products enclosed in pouches are accommodated in a large cavity 50 and have an attached pouch which, in turn, is accommodated in an adjacent small cavity 50'. As can be seen in FIG. 4, two attached pouches can be housed in a same cavity 50'.

In the embodiment shown in FIG. 4, the partitions 55, 56' are provided to divide the cavities 50 and 50' into compartments. However, it will be noted that the partitions 56' can be omitted. Generally, only the cavities 50' need to be divided into compartments.

To form a conduit 10 according to the invention, a flat sheet metal is used that is stamped in such a way that it has a variable cross section in order to create the desired undulation and the cavities 50. Forming the conduits 10 by stamping has the advantage of leading to a cold drawing of the metal, which increases its mechanical properties in comparison with the rolling or folding processs used in the prior art.

Moreover, the stamping operation is easier to carry out on conduits that are on individual molds. In fact, when an individual mold is made in an elongated shape with a variable cross section by stamping, the pressure exerted on the ends of the individual molds gives rise to a clearance at the two ends. In the case of molds according to the present invention, one obtains the pressed products as clean cut slices which avoids, in particular, losses due to slicing. This is particularly true when using partitions 51 and 52.

According to the invention, as can be seen in FIGS. 5a and 5b, the conduit 10 comprises, at the level of each of its edges, a release 100 toward the outside in order to define a recess in which the cover can come to be easily inserted in a set manner.

The release toward the outside is advantageously realized on the conduit 10 open to the ends. During stamping of the sheet metal, the release 100 is deformed such that it follows the undulation of the rest of the conduit 10. This curve-stamped release 100 ensures the precise guidance of the covers 20 when they are introduced into the conduit 10. Moreover, it makes it possible to effectively stiffen the walls of the conduit 10. It thus limits the deformations of the molds during the pressing phases.

In the present embodiment, with particular reference to FIGS. 5a and 5b, each of the releases 100, present on both sides of the conduit 10, is comprised of a vertical wall 102 which is going to extend, with a shift toward the outside, the corresponding lateral wall 104 of the conduit 10. The wall 102 is joined at the corresponding end 104 by a bend 101, for example, consisting of a fold of 45° horizontally joining over the entire length of the conduit 10.

At the level of its upper part, the vertical wall 102 has a flap 103 which is turned toward the outside with a specific curvature in order to define an upper part of the widened conduit to accommodate the cover 20.

In the embodiment shown in FIG. 5a, the upper part 103 is formed by a 45° fold.

In the embodiment shown in FIG. 5b, this flap 103 is in the form of an arc of a circle, for example, with an angle equal to 90°, and ends in a longitudinal horizontal plane 105 (as can also be seen in FIG. 2). It will be noted that this plane 105 is limited on the outside by rectilinear edges 105a which, in the manufacturing process, are obtained by laser cutting. This particular flap 103 has the advantage of increasing the rigidity of the conduit 10.

When the sheet metal is stamped, the release 100 is deformed in such a way that it follows the undulation of the rest of the conduit 10, as can be seen in FIGS. 5a and 5b. Thus, the stamping line 60 engaging at the level of the separation between two cavities 50 is extended on the wall 102 by a stamping line 61. As can be seen in FIGS. 5a and 5b, the stamping is advantageously performed below the widened zone defined by the upper parts 103 of the releases 100 in order to facilitate the introduction of the cover 20 into the conduit 10.

According to the present invention, the cover 20 is obtained from a stamped sheet metal in order to create an undulation that corresponds to that of the conduit 10. In the present example, the cover 20 corresponds to the lower part of the turned down conduit 10. More precisely, this cover 20 is obtained by cutting, at the level of the line 61 or below the release 100, a conduit 10 and by keeping only the lower part thereof.

When two tables 2 are stacked on top of one another, the covers 20 of the upper table 2 come to be inserted into the conduits 10 of the lower table 2. It can be seen in FIGS. 5a and 5b how this insertion is made. Due to the widened part 10, the cover 20 is guided during its introduction into the recess which consistutes the release 100, thus facilitating this introduction into the corresponding conduit 10. The edge of the cover 20 then comes to slide along the releases 100 of the conduit 10. The cover is thus perfectly guided to cover the lower part of the conduit below the bend 101.

As can be seen in FIGS. 1a and 1b, the conduits extend for a certain distance beyond the cavities 50. In fact, in FIGS. 1a and 1b, each conduit 10 comprises four cavities 50 and is extended beyond the zones 57. The advantage of an arrangement of this type results in the fact that the cut of the ends of each conduit 10 is made on the least cold-drawn part thereof, which renders this cut cleaner.

In a particular embodiment, the cut of a conduit 10 along a transverse plane containing a narrowing zone 51 or 52 is shown in FIG. 6. In this FIG. 6, the presence of a transverse partition 55 (or 56) and a cover 20 similar to the one which was already shown in FIG. 2 is shown. According to the embodiment which is shown in FIG. 6, each transverse partition 55 (or 56) laterally exhibits openings 55a1 and 55a2 (or 56a1 and 56a2) which leave an empty space, in the upper lateral part of each partition 55 (or 56), between the partition 55 (or 56) and the conduit 10. When the food product is cooked in the cooking bags, when the cover 20 is in place, the flaps of the bags come to be housed in this empty space, thus preventing them from being sliced between the cover 20 and the upper ridge of the partition 55 (or 56), in particular at the intersection with the conduit 10.

A table 2 according to a preferred embodiment of the present invention can be mounted on support frames provided with feet and crossbars, for example, of the type described in French Patent No. 87 07 108. They include a stackable set that is used as such for the industrial molding of the food products such as, in particular, hams.

The invention claimed is:

1. A mold table for food products comprising at least one longitudinal conduit that can be closed by a cover; said at least one conduit having a variable cross section so as to define at least one cavity that forms a mold for said food products; the variable cross section being such that the cavity has different cross sectional areas along the length of the cavity, said at least one conduit including, at the level of each of its edges, a release toward the outside, the conduit and release being shaped and dimensioned to form a recess along the side walls of the conduit and in which said cover can be inserted in a set manner.

2. A mold table for food products according to claim 1, wherein said at least one conduit has narrowing zones spaced at regular intervals over its length to define the length of said at least one cavity.

3. A mold table for food products according to claim 2, wherein said at least one conduit comprises, at the level of each of said narrowing zones, a transverse partition that divides each cavity into compartments.

4. A mold table for food products according to claim 2, wherein said at least one conduit comprises, on the one hand, small narrowing zones and larger narrowing zones over its length and, on the other hand, lateral walls curved in such a way so as to join said narrowing zones and to render the cross section of each cavity variable.

5. A mold table for food products according to claim 4, wherein said at least one conduit comprises, at the level of said narrowing zones, small transverse partitions and larger transverse partitions that define a compartment with a variable cross section for each cavity.

6. A mold table for food products according to claim 1, wherein said at least one conduit comprises narrowing zones to define, on the one hand, said cavities fanning a mold for said food products and, on the other hand, other cavities that are smaller than the first named cavities.

7. A mold table for food products according to claim 6, wherein said at least one conduit comprises, at the level of each of said narrowing zones, small transverse partitions and larger transverse partitions that define a compartment for each cavity.

8. A mold table for food products according to claim 1, wherein said release includes:
(a) a wall that:
  (i) has one end connected to the conduit by a bend that is proximate an edge of the cover while the cover closes the conduit;
  (ii) extends at right angles to a longitudinal axis of the cavity in a plane parallel to the cavity cross sections; and
  (iii) is outside the cover while the cover closes the conduit, and
(b) a flap connected to a second end of the wall, the flap extending away from the cross sections to define a widening for facilitating guidance of the cover toward the bend.

9. In combination,
plural molded food products;
a mold table in which the plural molded food products are located,
the mold table including an elongated sheet metal conduit having:
(a) a longitudinal axis;
(b) a plurality of cavities in which the molded food products are located, the plurality of cavities being disposed along the longitudinal axis, each of the cavities having cross sections with areas having differing dimensions within a particular cavity, the cross sections being at right angles to the longitudinal axis;
(c) recesses in a wall of the conduit at one end of the cavities, the recesses being between adjacent cavities; and
(d) releases for the food products, the releases being connected to the recesses by bends that extend outwardly from the cross sections, the releases being shaped to follow undulations of the walls of the conduit and stiffen the conduit walls, the releases including:
  (i) a wall having one end connected to the conduit at the recesses, the wall extending approximately at right angles to the longitudinal axis in a plane approximately at right angles to the direction of the bends; and
  (ii) a flap at a second end of the wall of the release, the flap extending away from the cavities; and
(e) a separate cover for each of the cavities, the covers having walls with ends that fit into the releases in such a manner that ends of the walls of the cover are inside the walls of the releases and edges of the ends of the walls of the cover are proximate the bends.

10. A mold table for food products according to claim 8, wherein said flap is flat and inclined by about 45° relative to the wall.

11. A mold table for food products according to claim 8, wherein said flap has a round cross section.

12. A mold table for food products according to claim 1, further comprising several conduits arranged side by side so as to be parallel and transverse tables forming struts which are arranged longitudinally, at regular intervals, between said conduits and on which said conduits are fixed.

13. A mold table for food products according to claim 12, wherein said transverse tables forming struts extend laterally for a certain distance beyond the conduits and engage both sides of said table.

14. A mold table for food products according to claim 12, wherein said cover is fixed on said transverse tables forming struts below said at least one conduit in such a way that, when two mold tables are stacked, a cover of the upper table can come to rest in the release of the conduit of the lower table.

15. A mold table for food products according to claim 1, wherein (a) each transverse partition has an upper ridge which is rectilinear and more or less at the level of the upper edges of the conduits and (b) said cover is comprised of several cover elements arranged to come to rest between two transverse partitions.

16. A mold table for food products according to claim 15, wherein each cover element is fixed by struts under the conduit of another table in such a way so as to be able to close the cavity between two transverse partitions.

17. A mold table for food products according to claim 1, wherein the transverse partitions include lateral openings.

18. A mold table for food products according to claim 1, wherein said table is mounted on a support frame having feet and crossbars arranged to make the table stackable.

19. A mold table for food products according to claim 1, wherein said at least one conduit is formed from a flat metal sheet that is stamped.

20. A mold table for food products according to claim 14, wherein said cover is formed from a flat metal sheet that is stamped.

21. A mold table for food products according to claim 14, wherein said cover is formed by the lower part obtained by cutting said at least one conduit along a longitudinal horizontal plane and by keeping only the lower part.

22. A mold table for food products according to claim 21, wherein the cutting plane of said at least one conduit corresponds to a plane containing the fold forming the release of said conduit.

23. In combination, a mold table, a food product in the mold table, a cover on the mold table, the mold table having at least one longitudinal conduit that is closed by the cover, said at least one conduit having a variable cross section so as to define at least one cavity that forms a mold in which the said food product is located; the variable cross section being such that the cavity has different cross sectional areas along the length of the cavity; said at least one conduit including, at the level of each of its edges, a release toward the outside; the conduit and release being shaped and dimensioned to form a recess along the side walls of the conduit and in which said cover is inserted in a set manner.

24. The combination of claim 9, wherein the bends extend in the same direction as the longitudinal axis of the conduit.

25. The combination of claim 9, wherein the bends extend substantially transversely of the longitudinal axis of the conduit.

26. The combination of claim 9 further including a partition seated in the recesses at the ends of each cavity.

* * * * *